United States Patent [19]

West

[11] 4,005,405
[45] Jan. 25, 1977

[54] ERROR DETECTION AND CORRECTION IN DATA PROCESSING SYSTEMS

[75] Inventor: Joseph Thomas West, Boxborough, Mass.

[73] Assignee: Data General Corporation, Southboro, Mass.

[22] Filed: May 7, 1975

[21] Appl. No.: 575,357

[52] U.S. Cl. .............. 340/146.1 AL; 235/153 AM
[51] Int. Cl.² ........................................ G06F 11/10
[58] Field of Search ........... 340/146.1 AL, 146.1 F, 340/146.1; 235/153 AM

[56] References Cited

UNITED STATES PATENTS

| | | | |
|---|---|---|---|
| 3,218,612 | 11/1965 | Sorg, Jr. et al. | 340/146.1 AL |
| 3,439,331 | 4/1969 | Brown et al. | 340/146.1 AL |
| 3,474,413 | 10/1969 | Dryden | 340/146.1 AL |
| 3,478,313 | 11/1969 | Srinivasan | 340/146.1 AL |
| 3,623,155 | 11/1971 | Hsiao et al. | 340/146.1 AL |
| 3,697,949 | 10/1972 | Carter et al. | 340/146.1 AL |
| 3,814,921 | 6/1974 | Nibby et al. | 340/146.1 AL |
| 3,825,893 | 7/1974 | Bossen et al. | 340/146.1 AL |
| 3,836,957 | 9/1974 | Duke et al. | 340/146.1 AL |
| 3,851,306 | 11/1974 | Patel | 340/146.1 AL |
| R23,601 | 12/1952 | Hamming et al. | 340/146.1 AL |

Primary Examiner—Charles E. Atkinson
Attorney, Agent, or Firm—Robert F. O'Connell

[57] ABSTRACT

An error detection and correction system for use in a data processing system wherein all single bit errors in a data word can be detected and corrected by the use of a unique modified Hamming code technique. In accordance therewith, during the write portion of a memory cycle, odd and even parity checks are made on a predetermined number of different, selected combinations of bits in each data word, to form a plurality of parity check bits which are combined with the original data word bits to form an extended data word. During the read portion of the memory cycle, the same number of odd and even parity checks are made on selected combinations of bits of the extended data word which combinations include the same selected combinations of bits used during the write portion plus the parity check bit associated therewith to provide a plurality of error bits. The error bits are decoded to identify the location of any single-bit error which may have occurred in the extended data word so that the bit in such location can be corrected.

9 Claims, 10 Drawing Figures

ERROR DETECTION AND CORRECTION IN DATA PROCESSING SYSTEMS

INTRODUCTION

This invention relates generally to techniques and apparatus for assuring data integrity in data processing systems and, more particularly, to such techniques and apparatus for detecting and for correcting data bit errors which occur therein.

BACKGROUND OF THE INVENTION

In data processing systems single or multiple bit errors may occur to affect the validity of the data which is being processed therein. Such data errors may arise in the memory storage system of such data processors and have been found to arise particularly when semiconductor memory devices are being utilized.

In systems having relatively low data storage capacity, e.g., in data processing systems which are often referred to as "minicomputers", such systems often having storage capacities as low as 32K words or less, the problems of data integrity often have not been considered as important as data errors which are likely to occur in systems having much larger storage capacities. However, as minicomputers utilize larger and larger storage capacities, sometimes extending the storage capacity to as high as 128K words or more, and are used in a larger variety of applications, the problem of data errors, particularly single bit data errors, has begun to require the attention of designers and manufacturers thereof.

In systems which detect single bit errors, the error correction techniques which may be employed often depend on the particular application in which the data processing system is being utilized. For example, where such computers are used in controlling manufacturing processes on a production line and the presence of a single bit error may be extremely harmful, the overall production line may often have to be shut down completely while the error is corrected in some appropriate manner. Since such shut-downs are costly and time consuming, it is desirable to be able not only to detect the errors but also to correct them substantially immediately.

In other applications where an error has been detected during the implementation of a particular software program, the approach has often been to correct the error and to re-run the entire program from the beginning once again. In applications wherein the program run is a long one, e.g., where the program may run for several days, such a re-run procedure utilizes valuable time so that it is desirable to be able to detect and to correct errors promptly in order to avoid the time loss as well as the re-run costs that may be incurred.

In relatively large capacity computers, error detection is often implemented through the use of conventional parity checks. Such conventional parity check procedures, however, do not detect all of the single bit errors which may occur and, further, even for those single bit errors which are detected, parity check techniques do not provide for any correction thereof. In using conventional parity check procedures, further techniques must be devised for the correction of errors and, to this end, it has been suggested that Hamming codes be utilized in conjunction with parity checks to provide a direct address of the error location so that correction thereof can be made. The primary problem in utilizing conventional Hamming codes for producing direct address information lies in the fact that too many Hamming code terms are needed to provide suitable address identification. For example, in using normal Hamming code techniques, with a 16-bit data word, up to 11 to 12 terms effectively representing 11 or 12 bits of the data word are required to be processed by a single logic element (i.e., an exclusive-OR element) in the implementation of Hamming code procedures. In the present state of the art, however, logic elements having more than 9 inputs at most are not available and in order to implement conventional Hamming code techniques, specially designed logic elements must be made for such use which designs undesirably increase the cost of manufacture of the error detection and correction system. Such cost increase is particularly disadvantageous in minicomputer systems where such costs are an important competition consideration. Hence, the use of conventional Hamming codes to provide direct address information has usually been avoided except in relatively large capacity systems.

SUMMARY OF THE INVENTION

In accordance with the invention, detection and correction techniques have been devised for providing specific identification of all single bit errors which may occur in each data word. The invention utilizes a modified Hamming code technique which has the capability of readily identifying each single-bit error location and of correcting such error promptly through the use of standard, and readily available, state-of-the-art logic elements having no more than 9 inputs. Thus, the invention as described herein, although useful in systems of any capacity, is particularly advantageous for use in data processing systems having relatively low storage capacity, as in minicomputer systems, and does not require specially designed and relatively expensive logic elements for its implementation.

Further, the system of the invention is designed to provide not only the identification of all single-bit errors but also the identification of those situations which represent substantially failure of a memory unit wherein the word read therefrom during the error detection process contains either all ones or all zeros, which conditions may result from such failures of the memory unit as to require replacement of the entire unit.

Thus, in accordance with a particular embodiment of the error correction and detection system of the invention for use with a data processing system to detect errors in the data words thereof, a plurality of parity check bits are formed from each word and are added thereto to provide an extended data word which is stored in a memory unit for subsequent error detection and correction use. In forming such additional plurality of parity check bits, a unique parity check process which, in effect, represents a modified Hamming code encoding process is used.

In accordance therewith, parity checks are made, during the write portion of the memory operating cycle, on a predetermined number of different, and specially selected, combination of bits of a data word to produce the parity check bits. Thus, for a 16-bit data word, for example, five parity checks are made, during the write portion of a memory cycle, on five different 8-bit combinations of the data word bits to form the five parity check bits which are then added to the original 16 data bits to form a 21-bit extended data word which is then appropriately written, i.e., stored, in the memory unit.

During the read portions of the memory cycle when such word is to be retrieved, i.e., read, from the memory unit a further plurality of parity checks are made on the same predetermined number of different, and specially selected, combinations of bits in the stored extended data word to produce the same predetermined number of parity check error bits. The selected combinations of bits of the stored word comprise the same selected combinations of bits as used in the parity checks of the original data word plus one bit which corresponds to the parity check bit associated with each combination during the write portion of the memory cycle. Thus, for a 21-bit stored word which includes the original 16 data bits and the 5 parity check bits, the parity checks during the read portion are made on five selected combinations of 9 bits of the 21-bit word which 9 bits include the same 8-bit combinations originally used plus the parity check bits associated therewith in each case.

The five error bits form a "fault code word" which can be appropriately decoded to determine whether an error has occurred. The 5-bit fault code word which is so formed identifies all single bit errors which may have occurred in the 16-bit data word and is used as well to identify certain other conditions which represent substantially complete failure of the memory unit (i.e., where the 21-bit stored word as read contains all ones or all zeros), and which represent situations in which some multiple bit errors occur.

The specific structure and operation of the error detection and correction system in accordance with the invention can be best described in more detail with the assistance of the accompanying drawings wherein.

Before discussing the specific error detection and correction logic of a particular embodiment of the invention in detail, it is helpful to understand the concept thereof in more general terms. The error correction system, in addition to detecting and correcting single bit errors in words read from memory, also permits the detection of certain situations in which substantially complete failure of a memory unit occurs. Further, the system provides error logging capability by maintaining appropriate address and bit registers therefor and further provides for the interruption of the operation of a central processor unit, if desired, when errors occur. The system is arranged to perform its error detection during normal memory cycles without any time delay. During those cycles wherein single bit errors requiring correction have been detected, processing is delayed during the re-write portion of the memory time cycle while the error is corrected. Each of the memory units of an overall data processing system is arranged to contain its own error detection logic, while any central processor unit which operates with such memory units is arranged to contain the error correction logic, as discussed in more detail below.

Figure 1:
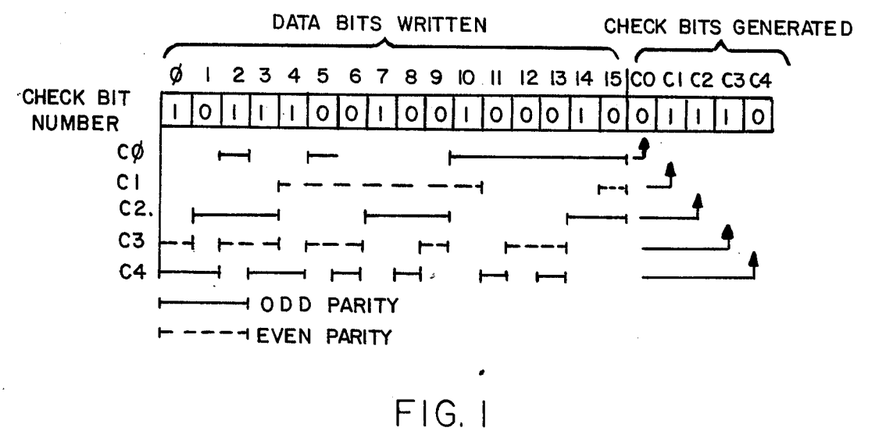
FIG. 1 shows a diagram of the manner in which the parity check bits are formed in accordance with the invention.

In accordance with the theory of operation of the error correction and detection system of the invention, used in a system handling 16-bit data words, as mentioned above, the system adds to each 16-bit word a 5-bit parity check field as each word is written into memory. As shown in FIG. 1, a sample word having 16 bits identified as bits $\phi$-15 has, in addition thereto, five parity check bits identified therein as check bits $C\phi$, C1, C2, C3 and C4. The check bits in each case are generated by calculating either an odd or an even parity across the data word, each check bit checking such odd or even parity of a unique combination of eight data bits of the 16-bit data word. Such parity checks represent a unique modification of the conventional parity checks performed in a straightforward Hamming code process used in error detection systems at the present time.

As shown in the diagram of FIG. 1, for example, the first check bit $C\phi$ checks the odd parity of data bits 2, 5, and 10–15; check bit C1 checks the even parity of data bits 4–10 and 15; check bit C2 checks the odd parity of data bits 13, 7–9, 14 and 15; check bit C3 checks the even parity of data bits $\phi$, 2, 3, 5, 6, 9, 12 and 13 and check bit C4 checks the odd parity of data bits $\phi$, 1, 3, 4, 6, 8, 11, 13. In FIG. 1 the solid line parity checks associated with check bits $C\phi$, C2 and C4 represent "odd" parity checks while the dashed lines associated with check bits C1 and C3 represent "even" parity checks. Thus, in the example shown the 21-bit word which is so generated includes exemplary data bits $\phi$-15 of the original 16-bit data word and the exemplary check bits $C\phi$–C4 which are specifically generated therefrom. The expanded 21-bit word is then written into the memory during a "write" portion of the memory cycle.

Figure 2:
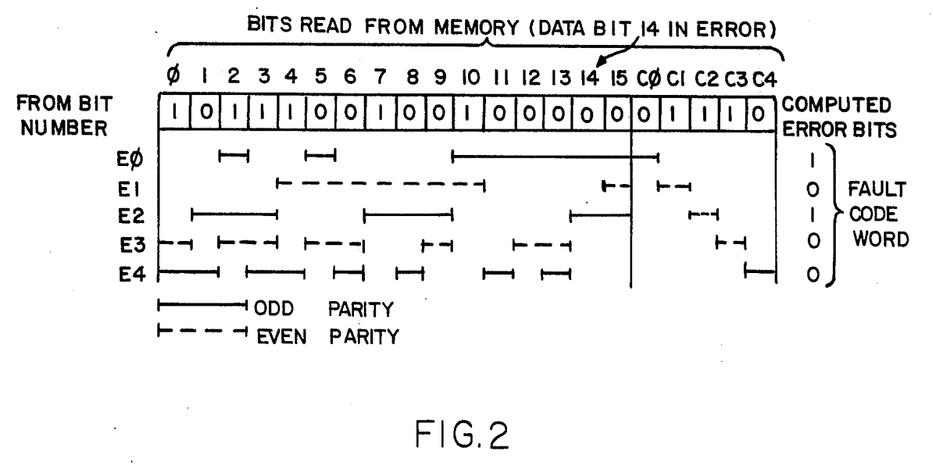
FIG. 2 shows a diagram of the manner in which the error bits are formed in accordance with the invention.

When the expaned 21-bit word which has been so written is subsequently read, a unique parity check thereof is again recalculated, this time for the entire 21 bits, including the five addended parity check bits $C\phi$–C4 thereof. The parity checks which are so made are effectively comparable to the parity checks previously made, only in this case each of the parity checks includes the corresponding check bit, as shown in FIG. 2, so that the parity checks are made with respect to 9-bit combinations of the 21-bit word. The recalculated parities provide a new 5-bit fault code word comprising error bits $E\phi$–E4, as seen therein. Thus, fault code bit $E\phi$ is generated by a parity check of the same bits as were included for the parity check which generated check bit $C\phi$ and, in addition, includes the $C\phi$ bit itself. The same holds true for each of the subsequent fault code error bits E1–E4. As before, the $E\phi$, E2 and E4 fault code bits are generated by an "odd" parity check as indicated by the solid lines, while the fault code bits E1 and E3 are generated by an "even" parity check as indicated by the dashed lines.

For the particular example shown in FIGS. 1 and 2, it has been assumed that an error has occurred in bit 14 which in the original 16-bit word as written is a "1", while in the word as read is a "$\phi$". Such a single bit error results in the generation of a unique fault code word, which, in the case under discussion, is represented by the 5-bit fault code bits E$\phi$–E4 as 10100. Generation of a 5-bit fault code word permits identification of 32 different error situations including one in which no errors occurred, twenty-one in which all single bit errors of the 21-bit word as stored are identified by location, two in which the 21-bit word as read at the memory location involved contains all ones or all zeros (representing substantially complete failures of the memory unit) and eight in which the presence of multiple bit errors is indicated, although the locations thereof are not specifically identified. An exemplary table of the 32 5-bit fault code words and the meaning of each of the unique code combinations thereof is shown in TABLE 1.

TABLE 1

| Fault Code Word | Meaning |
| --- | --- |
| 00000 | No error. |
| 00001 | The error was in check bit 4. |
| 00010 | The error was in check bit 3. |
| 00011 | The error was in data bit 0. |
| 00100 | The error was in check bit 2. |
| 00101 | The error was in data bit 1. |
| 00110 | The error was a multiple bit error. |
| 00111 | The error was in data bit 3. |
| 01000 | The error was in check bit 1. |
| 01001 | The error was in data bit 4. |
| 01010 | All 21 bits of the memory location are 1. |
| 01011 | The error was in data bit 6. |
| 01100 | The error was in data bit 7. |
| 01101 | The error was in data bit 8. |
| 01110 | The error was in data bit 9. |
| 01111 | The error was a multiple bit error. |
| 10000 | The error was in check bit 0. |
| 10001 | The error was in data bit 11. |
| 10010 | The error was in data bit 12. |
| 10011 | The error was in data bit 13. |
| 10100 | The error was in data bit 14. |
| 10101 | All 21 bits of the memory location are 0. |
| 10110 | The error was in data bit 2. |
| 10111 | The error was a multiple bit error. |
| 11000 | The error was in data bit 10. |
| 11001 | The error was a multiple bit error. |
| 11010 | The error was in data bit 5. |
| 11011 | The error was a multiple bit error. |
| 11100 | The error was in data bit 15. |
| 11101 | The error was a multiple bit error |
| 11110 | The error was a multiple bit error. |
| 11111 | The error was a multiple bit error. |

The fault code word which has been so generated at the memory unit is then supplied to the central processor unit error correction logic which includes decoding logic for decoding the fault code word to identify the location of the single bit error. Such logic then appropriately provides for the correction of the incorrect bit by suitably providing a complementary bit at the identified location. At the same time, the physical address of the defective memory word is stored at the central processor unit. The error correction logic also provides for an appropriate interruption of the central processor unit operation until such correction process is completed. The correction word is thereupon returned to the particular memory module to the correct address and rewritten therein.

Figure 3:
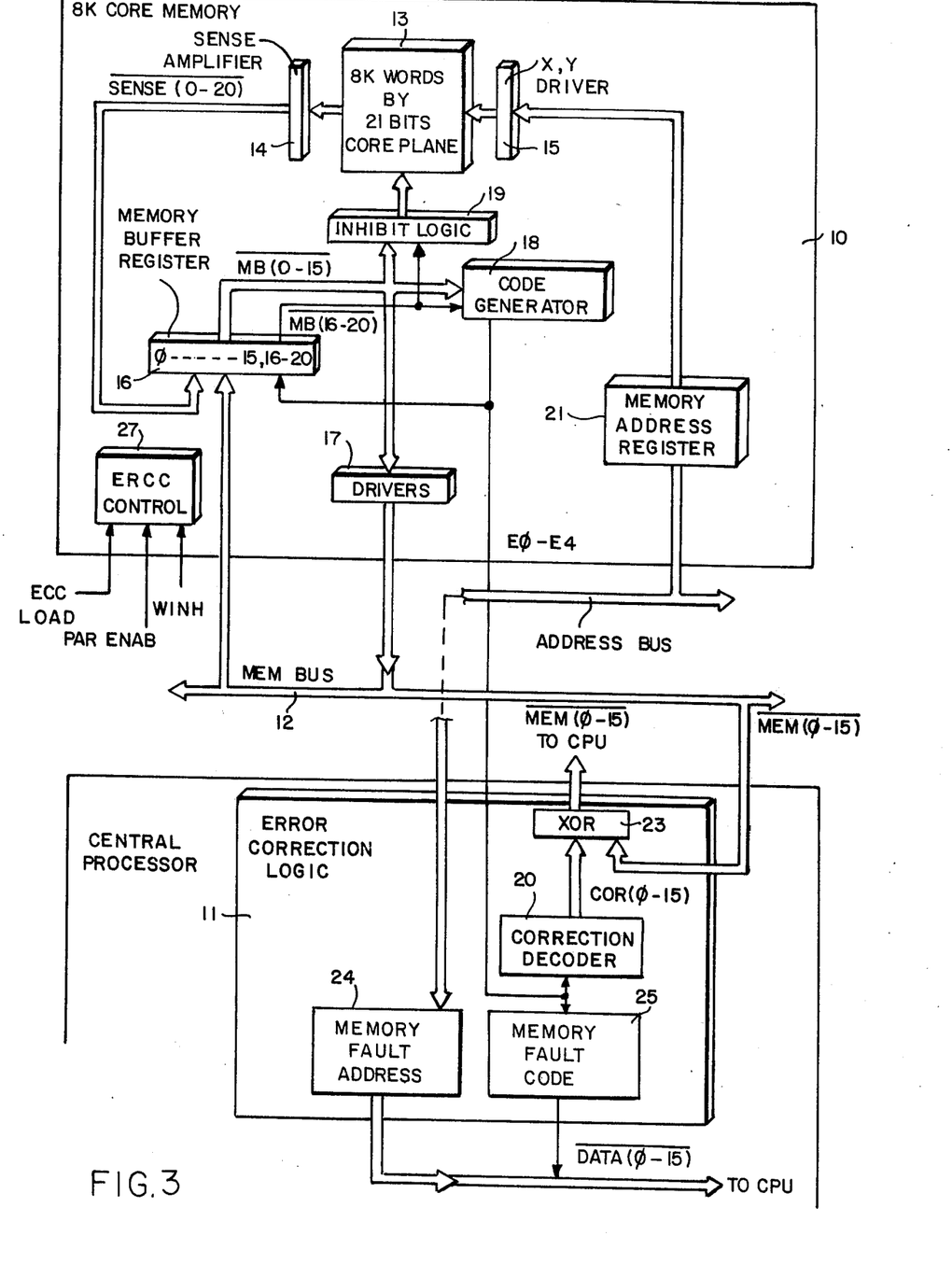
FIG. 3 shows a block diagram of the error detection and correction system of the invention.

With reference to the implementation of the error detection and correction logic at a typical memory unit and at a central processor unit, FIG. 3 shows appropriate portions of the error detection and correction system located both on a typical memory unit 10 which includes, for example, a memory plane 13 of 8K core memory devices and on a portion 11 of a central processor unit, such units being appropriately connected via a memory bus 12 (MEM BUS). In the embodiment being described, the central processor unit error logic, which will be discussed in more detail later, provides for error correction capability for any one of several memory units with no speed or performance degradation during the non-correcting cycles.

The core plane 10A of memory unit 10 comprises, for example, a core plane of 8K words having 21 bits. Appropriate sense amplifiers 14 provide sensing bits $\phi$–20 from the core memory devices, the latter devices being driven by appropriate X—Y drivers 15, as is conventional in well-known data processing memory storage units. Each word as read from the memory devices is appropriately placed in a 21-bit memory buffer register 16 which can also be supplied with a 16-bit data word from the memory bus as shown. The memory buffer register stores either a word for writing into an address location at the core plane from the MEM BUS or a word which has been read from an address location at the core plane for placement on the memory bus 12 via memory bus drivers 17.

A code generator 18 also supplied with the data word bits $\phi$–15 includes logic for calculating the parity check thereof, as discussed above, to produce the five parity check word bits 16–20 (corresponding to check bits C$\phi$–C4). When the code generator logic makes its parity check of bits $\phi$–15 during an original write operation, the check bits 16–20 are supplied to the memory buffer register 16 and thereupon to the core plane 10A together with the memory data bits $\phi$–15 via inhibit logic 19. During a read operation the code generator makes its parity check of all of the bits $\phi$–20 which are read from the core plane, including both the memory data bis $\phi$–15 and the check bits 16–20. Such parity check operation produces the fault code bits E$\phi$–E4 for supply to a correction decoder 20 of the error logic of the central processor unit.

The memory unit also includes memory address register 21 for storing addresses as obtained from address bus 22. The correction decoder 20 at the central processor unit decodes the fault code bits E$\phi$–E4 and makes an appropriate correction at the identified bit location if a single bit error has occurred, as discussed above, and thereupon provides a corrected data word, identified as $\overline{\text{COR}(\phi-15)}$, for supply to the data processing elements in the central processing unit via exclusive OR gate 23. If no correction is required, the data word as read from the core plane is supplied to the data processing elements of the central processor unit directly from the memory bus via gate 23 as shown. The address of the location of the incorrect data word is appropriately stored in a memory fault address register 24, while the fault code word E$\phi$–E4 from the memory is also appropriately stored in memory fault code register 25, as shown, such address and fault code information also being supplied to the appropriate data processing elements of the central processor unit, as discussed in more detail below. The memory unit also includes suitable error correction control logic 27, described in more detail below, for controlling the operation of the memory unit elements which enter into the error correction operation. The error correction load signal (ECC LOAD), the parity enable signal (PAR ENAB) and the write inhibit signal (WINH) are provided for such purpose by the central process unit as discussed in more detail below.

FIGS. 4–7 depict in more detail the logic utilized in a typical memory unit. Thus in FIG. 4 the memory buffer register and the extended memory buffer register portion thereof for memory bits 16–20 is shown as comprising six 8-bit registers 30–35. Each of the registers 30–33 is provided with four $\overline{\text{MEM}}$ bit inputs of the 16-bit word MEM $\phi$–15 from the memory bus and four corresponding memory location sense inputs (S$\phi$–S15) together with a clock pulse signal identified as the memory buffer load signal $\overline{\text{(MB LOAD)}}$ AD) for timely loading of the registers. The registers have the capability of being reset at the beginning of each memory cycle with an appropriate memory cycle signal ($\overline{\text{MEM CYCLE}}$) and also with a suitable signal for clearing the register before a read cycle ($\overline{\text{MB PRESET}}$). The outputs of the registers 30–33 are designated as memory buffer signals $\overline{\text{MB}\phi\text{–MB15}}$ and each is connected to a separate open collector memory bus driver (OR gate) 36 as shown. Each of the AND gates 36 is enabled by a $\overline{\text{DATA ENABLE}}$ signal which places data on the bus except, however, when the $\overline{\text{ECC LD}}$ removes the drivers from the bus denoting that an error correction cycle in the central processor unit is to be accomplished.

Figure 4:
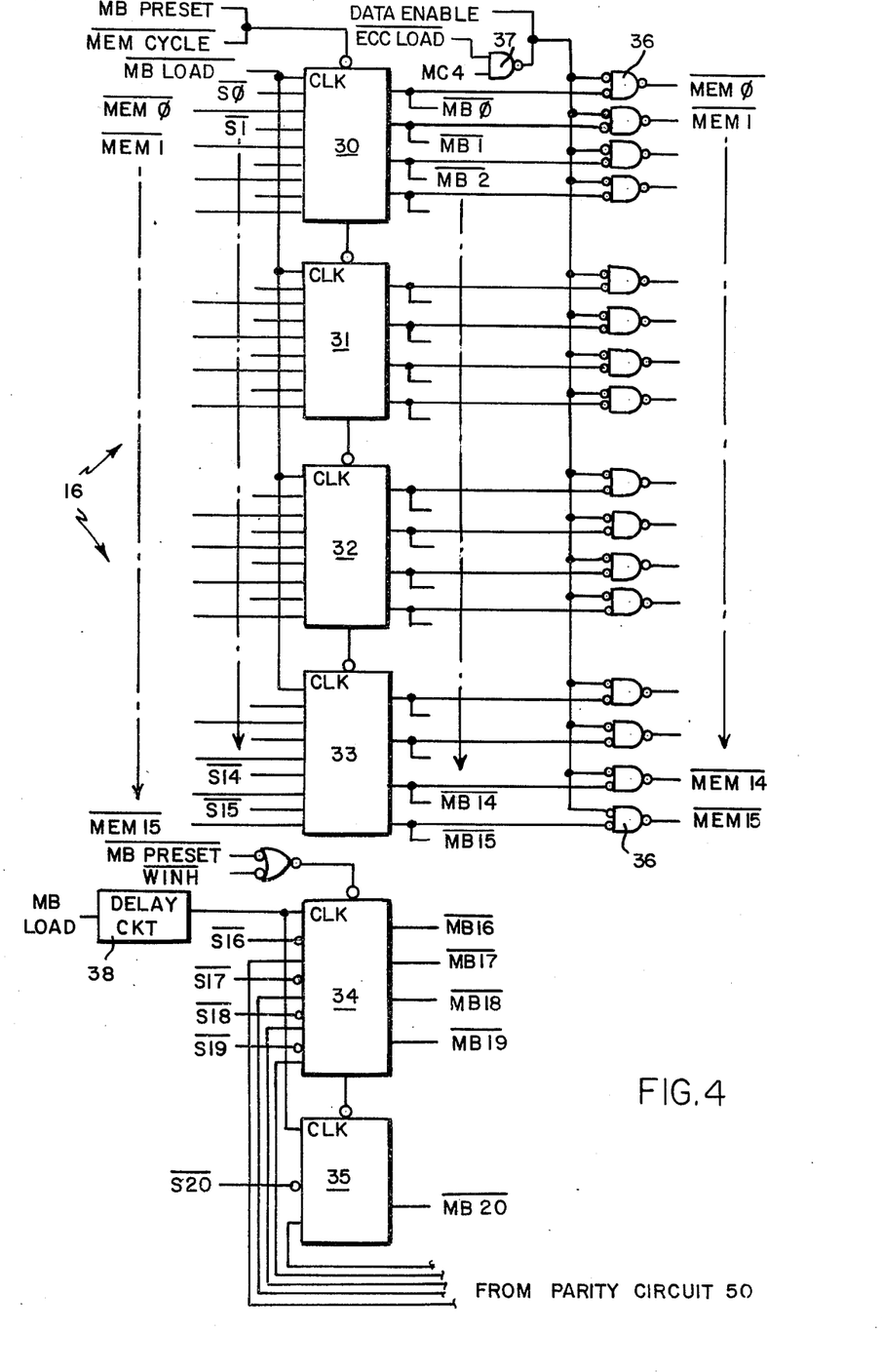
FIG. 4 shows a more detailed drawing of the memory buffer register portion of the system of FIG. 3.

Also shown in greater detail in FIG. 4 is the extended memory buffer register which comprises a pair of 8-bit registers 34 and 35 connected to the memory by sense lines $\overline{\text{S16–S20}}$ and five leads from the parity circuit 50 (shown in FIG. 5), the signals on the latter five leads representing the five parity check bits C$\phi$–C4 as discussed in more detail below with reference to FIG. 5. The $\overline{\text{MB PRESET}}$ signal is used to clear the registers 34 and 35 of the sense bits $\overline{\text{S16–S20}}$ before a read cycle. The $\overline{\text{WINH}}$ signal is used for software checking of the signal and, when utilized, causes all of the output bits $\overline{\text{MB16–MB20}}$ to be "1's" when the $\overline{\text{WINH}}$ signal is low. Registers 34 and 35, in a manner similar to that discussed above with respect to registers 30–33, are also clocked by the $\overline{\text{MB LOAD}}$ signal when the latter signal is low. However, in connection with the extended buffer registers 34 and 35, the $\overline{\text{MB LOAD}}$ signal is delayed by a delay circuit 38 for a sufficient time period to permit the parity circuit 50 to generate the five parity check bits from the signals $\overline{\text{MB}\phi\text{–MB15}}$. The outputs of registers 34 and 35 are denoted as bits $\overline{\text{MB16–MB20}}$.

Figure 5:
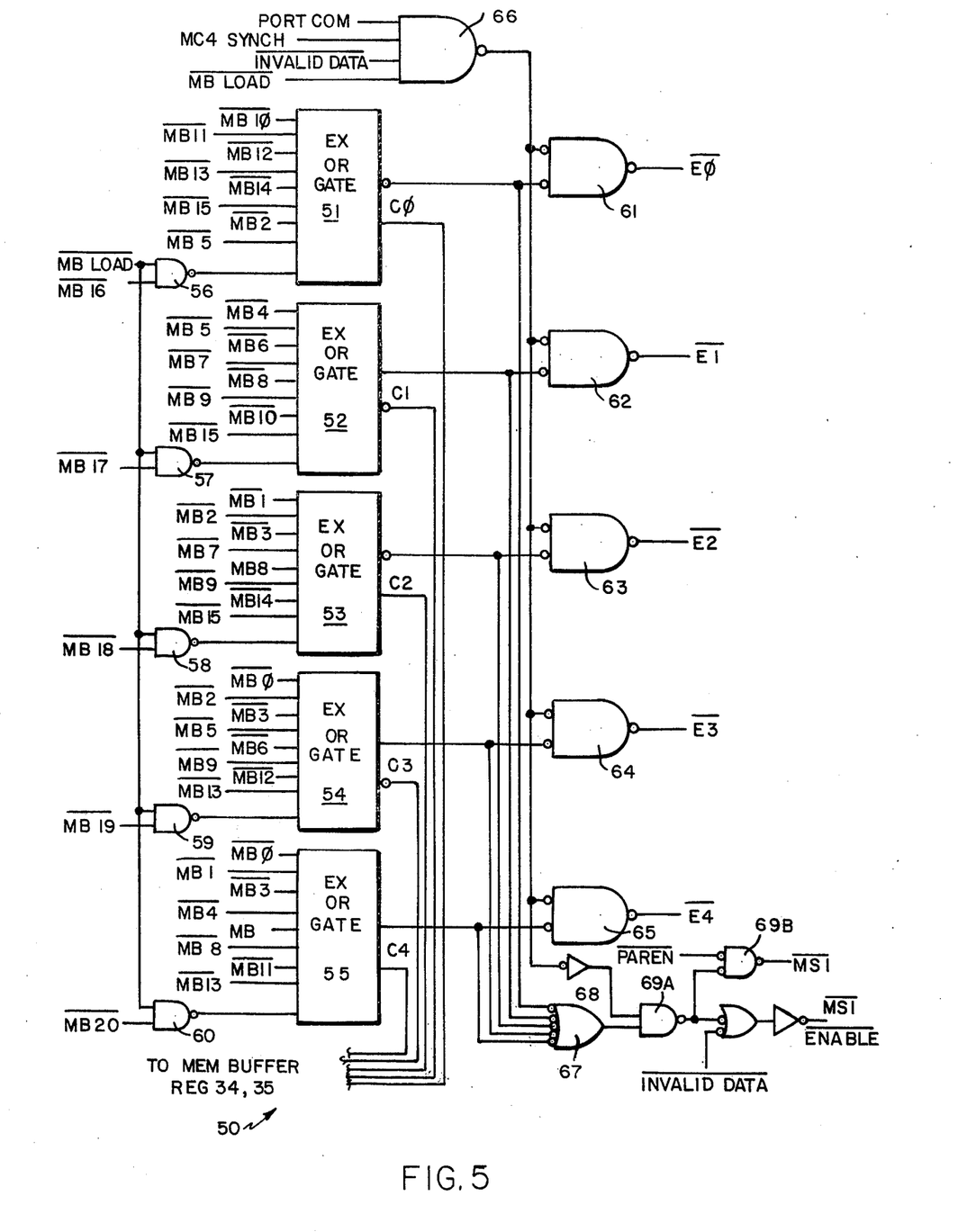
FIG. 5 shows a more detailed drawing of the code generator portion of the system of FIG. 3.

FIG. 5 shows the parity circuits 50 which are located on the memory unit, as is the memory buffer register circuitry shown in FIG. 4. Parity circuit 50 includes five exclusive-OR gate registers 51–55 each consisting of a separate chip having nine input lead connections and two output connections. Such chips may be, for example, of the type sold as Model No. 74S280 by Texas Instruments Corporation and are readily available as state-of-the-art elements for use herein. As will become evident, these gating units function not only as odd-/even parity bit generators but also as check signal generators. Output leads representing bits C$\phi$–C5 from each of the exclusive OR gate chips 51–55 are connected back to the extended memory buffer registers 34 and 35 (see FIG. 4) and provide the generated parity bits whereby, in a write operation, such parity bits are clocked out of the latter memory buffer registers at a time determined by the time delayed $\overline{\text{MB LOAD}}$ signal for generating the memory buffer register signals $\overline{\text{MB16–MB20}}$. These parity bits, which are stored in the extended memory buffer 16 as shown in FIG. 1, are checked again during a read cycle immediately preceding a data transfer. If the parity bits are checked out to be accurate (i.e., no errors exist), the data from the memory buffer register 16 is then passed through the enabled memory drivers 36 into the memory unit core and memory devices. The use of five conventional and readily available exclusive-OR gate registers of the nine-input type, as shown in FIG. 3, avoids the need for specially designed and more expensive elements having more than nine inputs as is normally required in conventional Hamming code error correction implementation. Such advantage results from the use of a modified Hamming-type code in which the parity check bits are generated from selected 8-bit combinations of the original 16-bit data word, and in which the fault code word bits are generated from parity checks of selected 9-bit combinations of the 21-bit extended word, as stored, as described above. The modified Hamming-type code is, accordingly, implemented by the nine-input exclusive-OR gates with the appropriate combinations of input signals as illustrated in FIG. 5.

The five exclusive-OR gate chips 51–55 are also connected to the $\overline{\text{MB16–MB20}}$ outputs via NAND gates 56–60, each of the NAND gates further having connected thereto the $\overline{\text{MB LOAD}}$ signal whereby $\overline{\text{MB16–MB20}}$ are so connected when the $\overline{\text{MB LOAD}}$ signal is high. When the $\overline{\text{MB LOAD}}$ signal is low the parity bits $\overline{\text{MB16–MB20}}$ have no effect on the generation of new parity bits $\overline{\text{E}\phi\text{–E4}}$. As is illustrated, each of the exclusive-OR gates 51–55 is connected to respective NAND gates 61–65, which gates are collectively enabled by an inverted AND gate 66 having as its inputs the $\overline{\text{MB LOAD}}$ signal and the $\overline{\text{INVALID DATA}}$ signal. The outputs of NAND gates 61–65 provide the parity fault code bits $\overline{\text{E}\phi\text{–E4}}$ as discussed above.

The inputs to NAND gates 61–65 are also supplied to a NOR gate 67 during the read operation. When the memory detects an error, the processor operation must be stopped until the correction has been made and the correction must proceed at the memory immediately. When an error is detected one of the inputs to OR-gate 67 goes low and the input to element 68 is low to indicate that a read is in progress. The output of AND-gate 69A is high and when the $\overline{\text{PAR ENAB}}$ signal from the processor is also high (indicating that a parity check should be made to investigate the presence of errors) the $\overline{\text{MS1}}$ signal is generated at the output of gate 69B, which signal is supplied to the processor to stop the operation thereof while the read portion of the memory cycle is in progress but before the processor completes the read cycle. When the correction has been made and the corrected data has been rewritten into the memory (i.e., the $\overline{\text{MB LOAD}}$ is asserted at gate 66) the $\overline{\text{MS1}}$ signal is removed to permit the processor to continue its read operation and, thereupon, to read the corrected word as desired.

Figure 6:
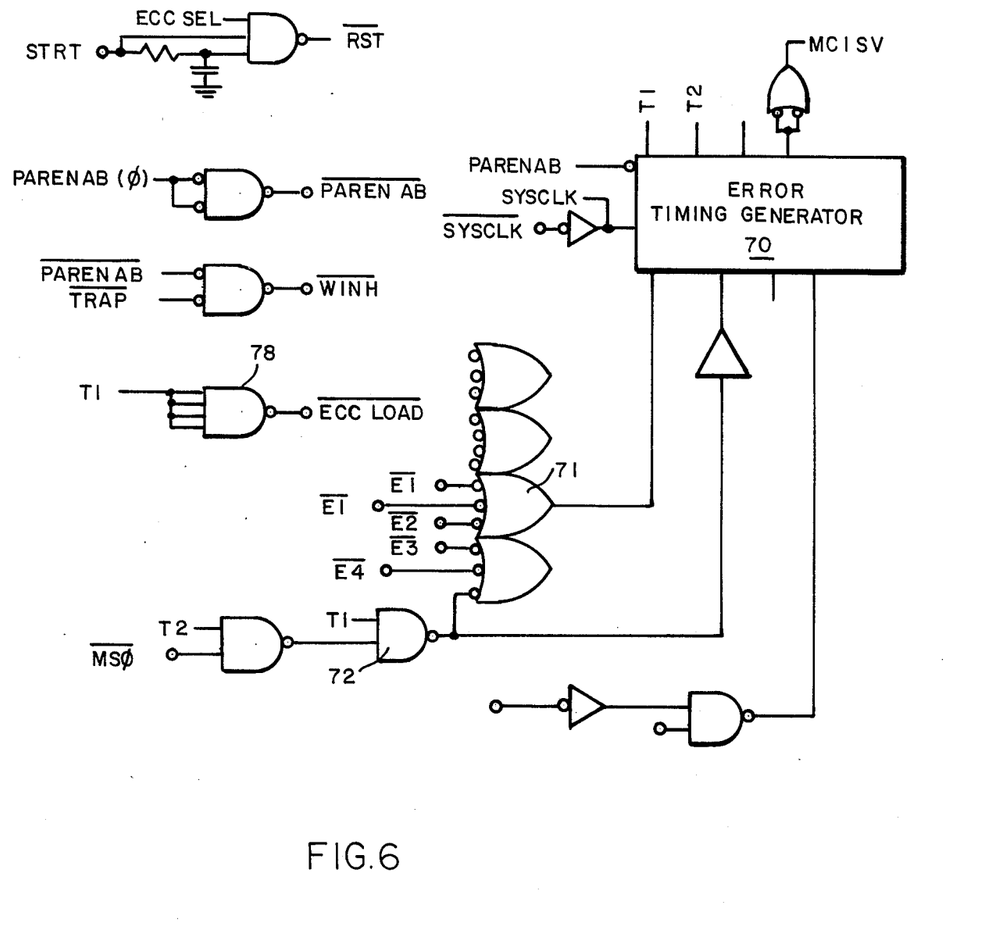
FIG. 6 shows a more detailed drawing of the timing control portion of the system of FIG. 3.
Figure 7:
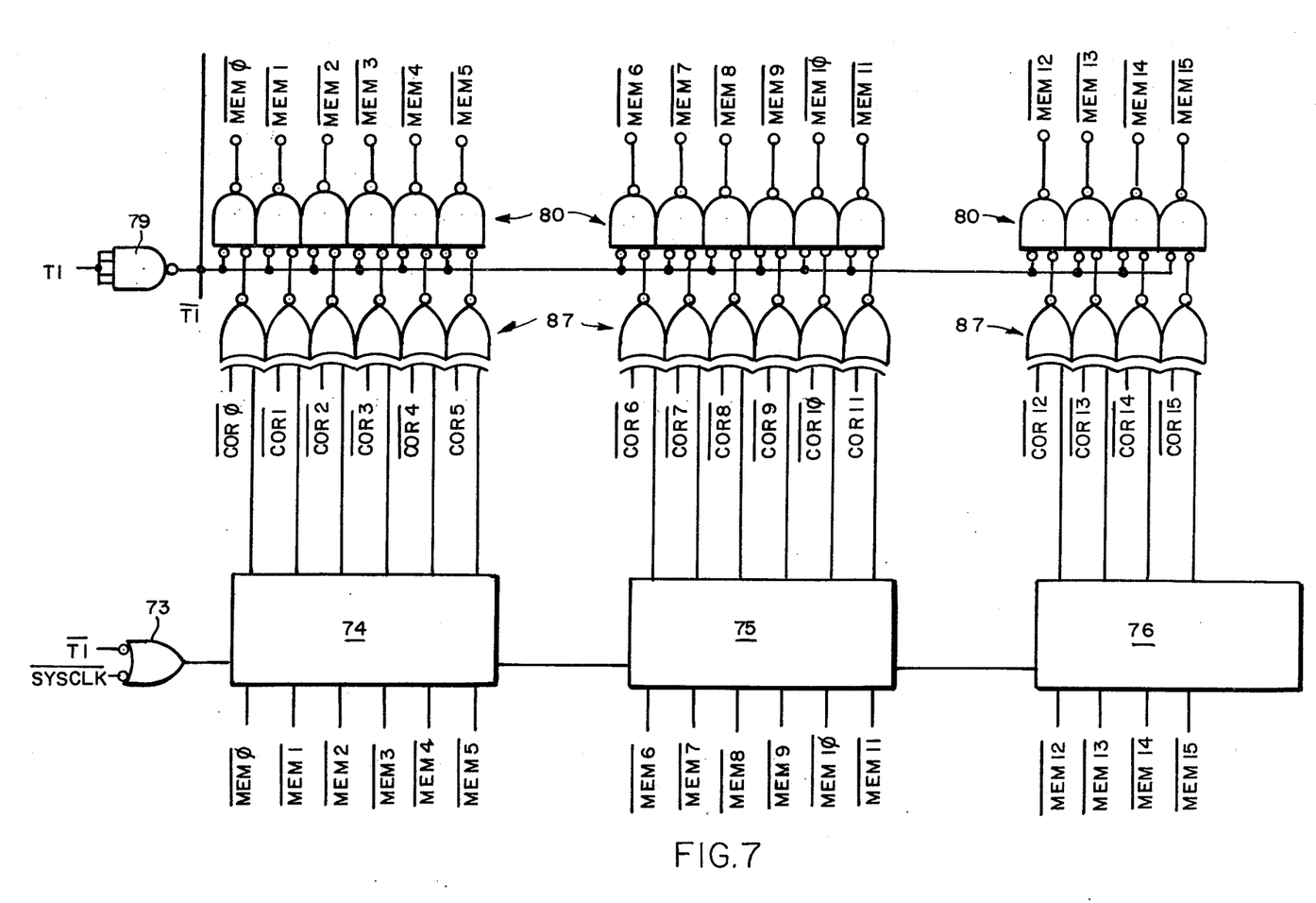
FIG. 7 shows a more detailed drawing of a part of the correction decoder portion of the system of FIG. 3.
Figure 8:
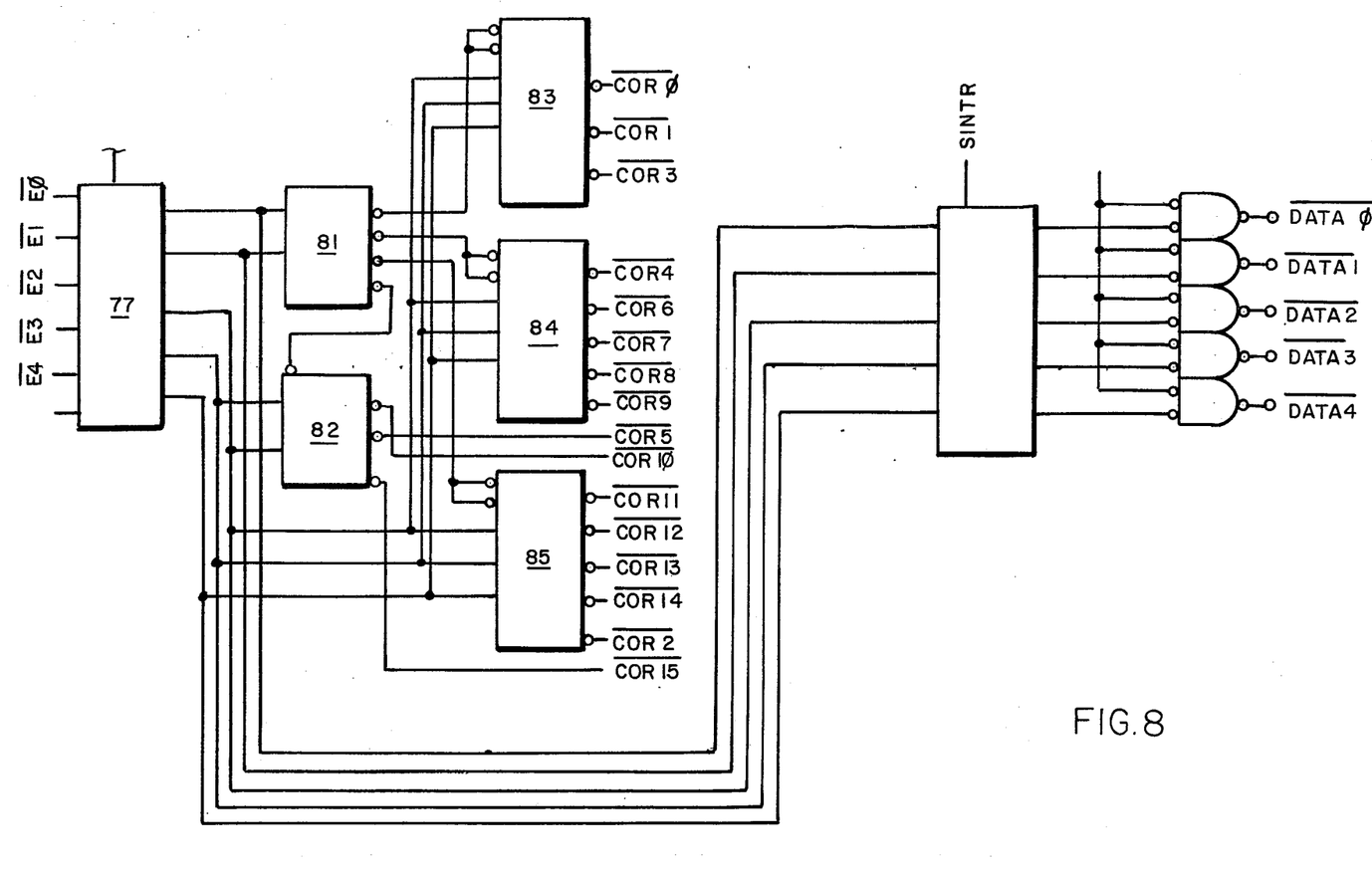
FIG. 8 shows a more detailed drawing of a part of the correction decoder portion of the system of FIG. 3.

FIGS. 6–8 depict the error correction logic which is located on the central processor unit as shown in FIG. 3. Thus, in FIG. 6 a timing generator 70 has one input supplied thereto via OR-gate 71, the latter gate having as its inputs each of the error bits $\overline{\text{E}\phi\text{–E4}}$ applied thereto. If no error has occurred, the output of OR-gate 71 is low so that the error correction timing generator which is normally continuously clocked by the system clock does not generate any error correction timing signals T1 and T2. If, however, an error has occurred so that any one of the error bits $\overline{\text{E}\phi\text{–E4}}$ is low, the output of OR-gate 71 goes high to indicate the presence of such error and the timing generator is activated in such a manner as to set the T1 output to go high. Such setting of T1 signifies the beginning of an error correction cycle, as discussed below, T1 also being fed back through AND gate 72 to set the T2 timing signal, the end of the latter signal signifying the end of the error correction cycle.

When $\overline{T1}$ goes low at OR-gate 73 in FIG. 7, which OR-gate output clocks the correction registers 74–77 (register 77 is shown in FIG. 8), the output of OR-gate 73 goes high and those registers are clocked so that the present state of the memory bus, including data bits $\overline{\text{MEM}\phi\text{-MEM15}}$ and error bits $\overline{\text{E}\phi\text{-E4}}$ are latched into the registers.

At the same time T1 is applied to AND-gate 78 so as to generate the error correction load signal $\overline{\text{ECC LOAD}}$ which is supplied back to the memory unit to indicate that the error correction cycle has begun.

The memory unit thereupon supplies an appropriate signal for stopping the operation of the central processor unit (i.e., other than the operation of the error correction circuitry thereon) during the error correction cycle. Such signal, for example, is denoted herein as the $\overline{\text{MS1}}$ signal on the memory unit as shown and discussed above with reference to FIG. 5.

When the T1 signal goes high the error correction circuitry on the central processor unit is accordingly activated to correct the error which has occurred in the data word in question, which data word has been loaded into the error correction registers 74–76, as shown in FIG. 8 and discussed in more detail below. The $\overline{\text{ECC LOAD}}$ signal removes the memory drivers in the memory unit from the memory bus as shown in FIG. 4 at the time the word $\overline{\text{MEM}\phi\text{-MEM15}}$ which contains the error and the error bits $\overline{\text{E}\phi\text{-E4}}$ are latched into the error correction registers. AND-gate 79 (see FIG. 7) places the error correction circuitry into communication with the memory bus when the timer T1 goes high at the beginning of the error correction cycle once the memory has been removed from the memory bus. Such communication occurs via the open collector drivers 80 of the correction circuit.

Once the memory bits are latched into the error correction registers, the decoder logic units 81–85 as shown in FIG. 8 operate to decode the modified Hamming code bits represented by the $\overline{\text{E}\phi\text{-E4}}$ bits, as discussed above with reference to TABLE 1, and thereby to appropriately identify which of the 16 bits of the data word which has been latched into registers 74–76 is to be corrected. Such correction occurs by the appropriate generation of the correction bits $\overline{\text{COR}\phi\text{-COR15}}$ from logic units 83, 84 and 85. The latter correction bits are supplied to NOR-gates 87 (FIG. 8) at the output of correction registers 74–76. In accordance with the decoding process the appropriate bit of correction bits $\overline{\text{COR}\phi\text{-COR15}}$ goes low and the output of its corresponding exclusive-OR gate 87 provides a bit which is the complement of the corresponding bit which had been latched into the correction system at the correction register (i.e., a "1" for a "$\phi$" or vice versa). The corrected data is then placed on the memory bus via the bus driver units 80.

The memory unit is then appropriately activated to rewrite the corrected data received from the memory bus therein. The memory unit operation, it should be recalled, had been halted due to the presence of an error correction load signal $\overline{\text{ECC LOAD}}$ after the memory unit had performed the "read" portion of the memory cycle and before the "rewrite" portion thereof. Upon reactivation of the memory unit, following correction of the error, the corrected data is thereupon rewritten into the memory core during the "rewrite" portion of the memory cycle.

The output of OR-gate 71 at the timing generator goes low and the timing generator is, accordingly, reset. At that time the corrected data is transferred to the appropriate logic as required in the central processor unit and also to the memory whereupon the memory rewrites the corrected data into the core at the correct address.

Figure 9:
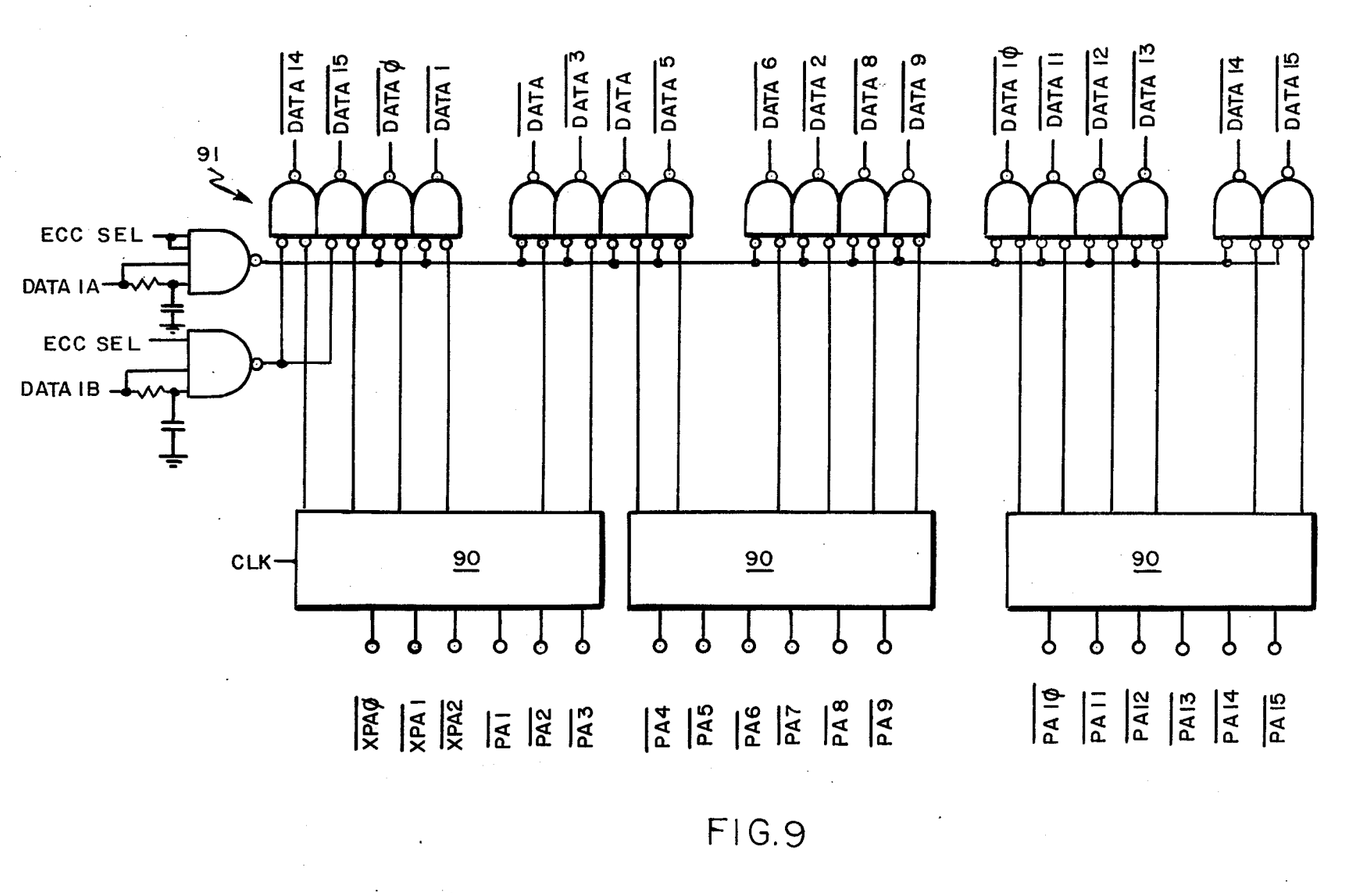
FIG. 9 shows a more detailed drawing of the error storage portion of the system of FIG. 3.

When an error has been detected and there is a desire to make available a permanent record of the location of the word in which the error has occurred at appropriate input/output (I/O) devices external to the system via suitable I/O data links, the address can be stored in registers 90 as shown in FIG. 9 via a suitable clock signal. Upon appropriate activation of I/O drivers 91 the address information can be supplied to a suitable I/O bus for external use, as desired.

Figure 10:
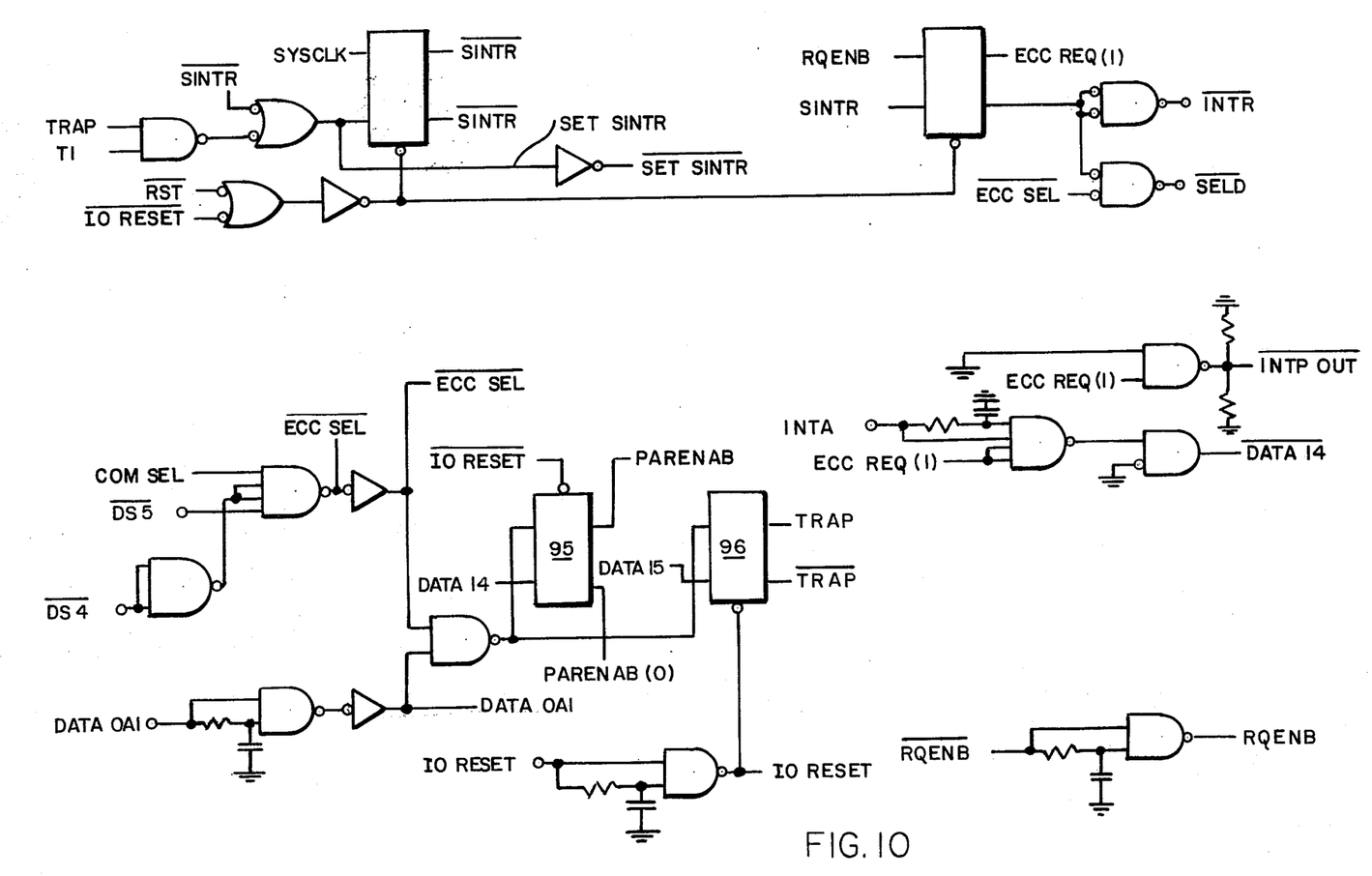
FIG. 10 shows a more detailed drawing of the logic for controlling the mode of operation of the system of the invention and the processor interrupt logic therefor.

A pair of flip-flop register units 95 and 96, as shown in FIG. 10, permits operation of the error correction system in one of four modes. In mode $\phi$ neither flip-flop is set and the error connection is maintained in a non-operative condition wherein no correction can take place and no interrupt of the central processor unit can occur. In Mode 1, flip-flop 95 is not set, while flip-flop 96 is set. In such mode, the correction system is maintained non-operative but a diagnostic mode for checking operation of the error system is implemented. Thus, on a write portion of a memory cycle the system will provide a predictable set of parity bits for simulating an error for diagnostic purposes only.

In mode 2, flip-flop 95 is set while flip-flop 96 is not set. This represents in effect a start-up mode wherein the error correction system will be in an operative state but no interrupt of the central processor can occur when the error check is being made.

In mode 3, both flip-flops are set and the error correction system is operative and the interrupt logic 97 is activated to permit the operation of the central processor to be interrupted for error checking purposes although operation thereof is not entirely stopped as in the case when an $\overline{\text{MS1}}$ signal is asserted for such purpose during an actual error correction process.

What is claimed is:

1. An error detection and correction system for use in a data processing system having at least one central processor unit and at least one memory unit, said error detection and correction system comprising
   error coding means associated with each said memory unit for performing, during the write portion of a memory operating cycle, parity checks on a predetermined number of different, selected combinations of bits in each data word of said data processing system, each combination having the same total number of bits, said error coding means comprising
   parity check means for providing a plurality of parity check bits, said parity check means performing odd parity checks on a first group of said predetermined number of selected combinations and even parity checks on a second group of said predetermined number of selected combinations, each parity check bit being associated with one of said selected combinations;
   means for forming an extended data word comprising the data bits of said data word and said parity check bits and for storing said extended data word in said memory unit;

said parity check means further performing, during the read portion of said memory operating cycle, parity checks on the same said predetermined number of selected combinations of bits of said extended data word, each said selected combination comprising the same selected combination of data bits as selected during said write portion and the parity check bit associated therewith, said parity check means performing odd parity checks on a first group of said predetermined number of selected combinations and even parity checks on a second group of said predetermined number of selected combinations, said odd and even parity checks thereby providing a plurality of error bits;

decoding means associated with said central processor unit responsive to said plurality of error bits for producing correction bits which identify the presence and location of a single bit error in said data word; and means connected to said decoding means and responsive to the correction bits from said decoding means for correcting said single bit error in said data word.

2. An error detection and correction system in accordance with claim 1 for use in a data processing system using 16-bit data words wherein said parity check means performs, during the write portion of a memory cycle, five parity checks on five selected 8-bit combinations of the 16 bits of a data word to produce five parity check bits;

said forming means forms a 21-bit extended data word comprising the 16 data bits of said data word and said five parity check bits;

said parity check means further performing, during the read portion of a memory cycle, five parity checks on five selected 9-bit combinations of said 21-bit extended data word, each 9-bit combination comprising 8 bits corresponding to the 8-bit combinations selected during the write portion of said memory cycle and the parity check associated therewith, whereby five error bits are provided.

3. An error detection and correction system in accordance with claim 2 wherein said parity check means includes five exclusive-OR gate registers, said registers each having nine inputs and being responsive to said five 8-bit combinations selected during the write portion of said memory cycle and to said five 9-bit combinations selected during the read portions of said memory cycle to provide said five parity check bits and said five error bits, respectively.

4. An error detection and correction system in accordance with claim 3 wherein the data bits of the 16-bit data words are identified as bits $\phi$ through 15 and said parity check means performing parity checks on the following five selected combinations of 8 bits of said 16-bit data words;
1. bits 1, 5, 10, 11, 12, 13, 14 and 15;
2. bits 4, 5, 6, 7, 8, 9, 10 and 15;
3. bits 1, 2, 3, 7, 8, 9, 14 and 15;
4. bits 1, 2, 3, 5, 6, 9, 12 and 13; and
5. bits $\phi$, 1, 3, 4, 6, 8, 11 and 13.

5. An error detection and correction system in accordance with claim 4 wherein said parity check means performs odd parity checks on said selected combinations (1), (3) and (5) and even parity checks on said selected combinations (2) and (4).

6. An error detection and correction system in accordance with claim 5 wherein said decoding means includes means responsive to said five error bits for identifying thirty-two conditions with respect to said 21-bit extended data word including (a) one condition wherein no errors occur therein; (b) twenty-one conditions wherein a single-bit error occurs therein; (c) two conditions wherein said 21-bit extended data word contains all ones and all zeros; and (d) eight conditions wherein multiple bit errors occur therein.

7. An error detection and correction system in accordance with claim 6 wherein said decoding means includes means responsive to said five error bits for generating a 16-bit correction word wherein, when a single-bit error has occurred in a data word, one bit thereof being in a first selected state and all other bits being in a second selected state, said one bit being at a location corresponding to the location of said single bit error; and said correcting means includes means responsive to said 16-bit correction word for correcting the bit at the said location corresponding to the location of the said single-bit error.

8. An error detection and correction system in accordance with claim 7 wherein said correcting means provides such correction by complementing the incorrect bit at said location and further including means for re-writing the corrected 16-bit data word in said memory unit.

9. An error detection and correction system in accordance with claim 1 wherein said parity check means performs said odd and even parity checks on alternate ones of said selected combinations, respectively, during both the re-write portion and re-read portion of said memory operating cycle.

* * * * *

UNITED STATES PATENT OFFICE
CERTIFICATE OF CORRECTION

PATENT NO. : 4,005,405
DATED : January 25, 1977
INVENTOR(S) : Joseph Thomas West It is certified that error appears in the above-identified patent and that said Letters Patent are hereby corrected as shown below:

Column 12, line 7, after "bits" cancel "1" and substitute ---2---;

line 10, after "bits" cancel "1" and substitute ---∅---.

Signed and Sealed this

Second Day of May 1978

[SEAL]

Attest:

RUTH C. MASON
Attesting Officer

LUTRELLE F. PARKER
Acting Commissioner of Patents and Trademarks